Feb. 7, 1967 H. J. HADEN 3,302,307
ACCELERATION DEMONSTRATING MEANS
Filed Dec. 2, 1963

INVENTOR.
Harley J. Haden
BY Harold J. LeConte
ATTY.

United States Patent Office 3,302,307
Patented Feb. 7, 1967

3,302,307
ACCELERATION DEMONSTRATING MEANS
Harley J. Haden, 1866 Alpha Road,
Glendale, Calif. 91208
Filed Dec. 2, 1963, Ser. No. 327,364
3 Claims. (Cl. 35—19)

This invention relates to teaching devices and more particularly to the means of demonstrating certain principles of physics.

The primary object of the invention is to provide a simple device capable of demonstrating that when a buoyant object is immersed in a body of fluid which is subjected to acceleration, there is a force exerted on the object by the fluid which is proportional to the mass of fluid displaced by the immersed object times the acceleration of the fluid and that the force is in the same direction as the acceleration of the fluid and acts at the center of mass of the displaced fluid. To state the principle involved in other words, this force is the result of a pressure gradient imposed upon the fluid by the acceleration of the container of the fluid. The preceding principle applies to immersed objects in general, but the word "buoyant" is used here to denote an object of lesser density than the surrounding fluid, and may even include an object approaching zero density.

Another object of the invention is to provide a device of the above character in which the fluid and immersed buoyant objects are subjected to rotation about an axis laterally removed from the immersed body to demonstrate that such rotation subjects the immersed object to centripetal force or center-seeking rather than centrifugal.

A further object of the invention is to provide a device embodying the principal objectives of the present invention which can be employed to demonstrate that a buoyant body immersed in a body of fluid and restrained in at least a partially submerged condition by a flexible member anchored at the lower point in the body of fluid is caused to move in the same direction as the direction of acceleration applied to the body of fluid due to the pressure gradient in the fluid imposed by acceleration of the fluid.

Figure 2:
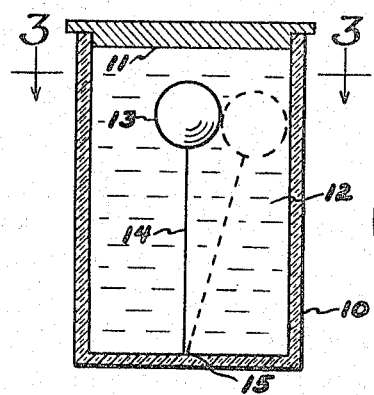
Figure 3:
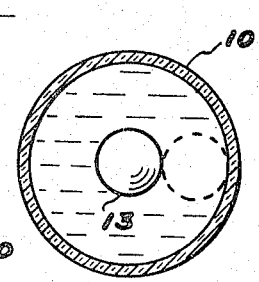
Figure 3A:
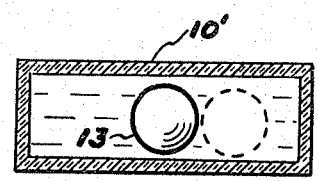
Figure 1:
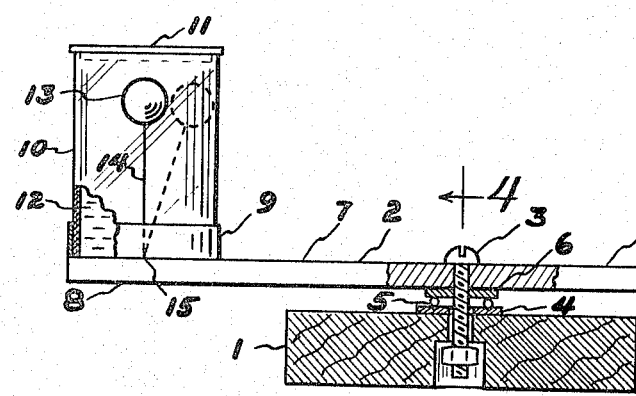
Figure 4:
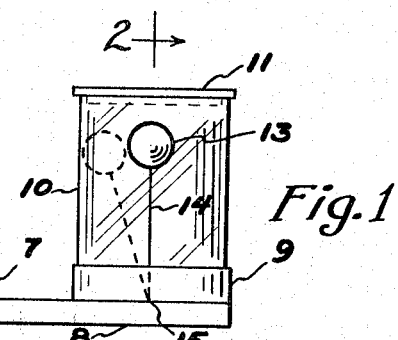
Figure 5:
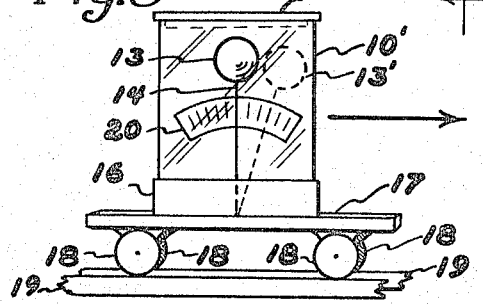
Figure 7:
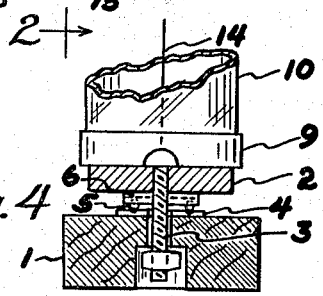
Figure 6:
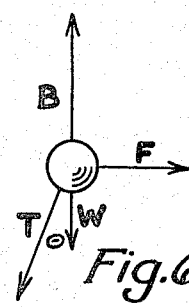
Figure 8:
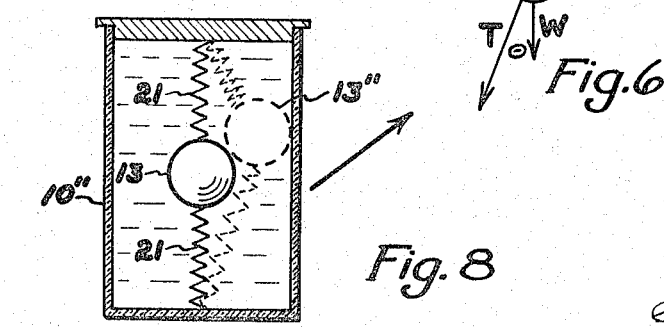

With the foregoing objects in view, together with such additional objects and advantages as may subsequently appear, the invention resides in the parts and in the construction, combination and arrangement of parts described, by way of example, in the following specification of certain presently preferred embodiments of the invention, reference being had to the accompanying drawings which form a part of said specification and in which drawings:

FIG. 1 is a side elevational view, partly in section, showing an apparatus for demonstrating the fact that when an immersed buoyant object and the fluid in which it is immersed are subjected to rotation about an axis laterally removed from the immersed body, the immersed body is subjected to centripetal force as the result of a pressure gradient in the fluid imposed by its acceleration, FIG. 2 is an enlarged scale, medial side elevational sectional view of one of the containers and the immersed buoyant objects shown in FIG. 1, FIG. 3 is a transverse sectional view taken on the line 3—3 of FIG. 2, FIG. 3a is a view similar to FIG. 3 but showing a different cross sectional configuration of container, FIG. 4 is a transverse sectional view through the pivotal means of the device shown in FIG. 1, FIG. 5 is a side elevational view showing a means for employing the invention to demonstrate the effect of straight line acceleration on the fluid and the immersed buoyant object, FIG. 6 is a free-body diagram of the forces acting on the buoyant body component of the illustrated embodiments of the invention when subjected to acceleration, FIG. 7 is a vector diagram of the forces involved when the device is subjected to acceleration, and FIG. 8 is a side elevation view similar to FIG. 2, showing how the buoyant body 13 may be constrained by springs 21, 21 for use to indicate acceleration in any direction as in interplanetary space.

Referring first to FIG. 1, the illustrated supporting means for the invention comprises a base 1 on which a plural armed turntable element 2 is mounted for rotation about a vertical axis comprising a bolt 3 and an interposed friction reducing bearing comprising a base washer 4, a retainer and bearing balls 5 disposed so that the balls thereof operate in suitable grooves in the member 4 and in the under face of the hub portion 6 of the turntable member 2. Any other suitable friction reducing means can, of course, be employed.

The turntable element 2 is provided with oppositely extending arms 7, 7 terminating in distal pad portions 8, 8 provided with sockets 9, 9 in which a pair of containers 10, 10 are disposed. As here shown, the containers comprise cylindrical transparent jars provided with covers 11 and filled with fluid 12, said fluid containing a buoyant object such as a hollow ball 13 immersed therein and restrained by a flexible cable 14 attached by any suitable means to the center of the bottom as at 15. Alternatively, instead of a circular cross section as shown in FIG. 3, the container may be of rectangular or other polygonal form here indicated in FIG. 3a as a rectangular form 10'. Next referring to FIG. 5, a rectangular form of container such as shown in FIG. 3a is mounted in a socket 16 on a support 17 capable of moving in a straight line as, for example, supplying the support 17 with wheels 18 mounted on track means 19. The showing of the two configurations of containers on separate types of support is not to be construed as limiting those containers to their respective supports as either container might be mounted on either the straight line or the rotative type of supporting means.

When the container and its fluid are in repose or moving at a constant velocity, the buoyant force of the fluid will tend constantly to try to displace the buoyant body 13 upwardly thus keeping the connecting member 14 taut and in a vertical attitude. When the container is subjected to acceleration in any direction, the fluid therein is also similarly subjected to the same acceleration with the result that the acceleration thus imposed on the fluid will create a pressure gradient in the fluid and will tend to move the buoyant body 13 in the same direction as the direction of acceleration as a result of this acceleration-imposed pressure gradient.

Having reference first to FIG. 5 in this consideration, and assuming that acceleration is imposed from left to right as viewed in that figure and as indicated by the arrow, the fluid will tend to displace the buoyant body 13 to the right as indicated by the dotted line position herein indicated as 13' the extent of such movement depending, of course, on the magnitude of the applied acceleration. The use of a flat sided container permits the painting or otherwise applying protractor lines 20 to the sides thereof so that the extent of angular movement of the restraining member 14 can be more accurately evaluated by observation or by photographic recording.

Referring next to FIG. 1, upon rotating the turntable means 2 with one or, preferably, a pair of containers mounted thereon complete with fluid and restrained buoyant bodies therein, it will be noted that the buoyant bodies instead of swinging outwardly in response to an expected centrifugal force, actually swing inwardly demonstrating that they are subjected, instead, to centripetal force. As the turntable member 2 and its load are caused to rotate on its pivotal mounting, centripetal force will be applied to the fluid in which the buoyant bodies 2 are immersed with the result that in accordance with the principles stated in the second paragraph of the specification there will be forces on the buoyant bodies 13 toward the pivot point on which the turntable is rotating, in response to the principle that under constant angular velocity, central acceleration is directly proportional to radius, thereby causing said buoyant bodies to move from the positions shown in full lines in FIGS. 1, 2, 3 and 3a to the dotted line positions indicated therein.

FIG. 6 is a free-body diagram of the forces acting on the buoyant object when subjected to acceleration while confined in the fluid of the container. These forces are the tension T in the anchoring element 14 for the buoyant body 13, the weight W representing the weight of the buoyant body, the buoyant force B on the body, and the force F exerted on the buoyant body by the fluid pressure gradient when the container and fluid are subjected to acceleration. The unbalanced resultant R of these four forces is shown in the vector diagram of FIG. 7 and is given by the equation $$R = F - (B - W) \tan \theta$$

where $\theta$ is the angle which the restraining member 14 makes with a vertical line extending through the laterally displaced buoyant body when under acceleration. This resultant must, by Newton's Second Law of Motion, equal the product of the mass of the buoyant body times its acceleration, which, when it is in equilibrium relative to the fluid, is the same as that of the fluid.

Actually, the device comprises an inverted pendulum which when not subjected to exterior forces responds to the force of gravity and, if desired, critical damping of this inverted pendulum may be accomplished by the use of a fluid of a suitable viscosity coefficient. The low mass of the buoyant body 13 makes critical damping an easier matter, which is one of the advantages of this system.

It has been previously mentioned that the angle $\theta$ is a function of the acceleration of the system and can be measured by means of a protractor associated with the container. A convenient means of providing a protractor has been suggested supra. The acceleration is given by the equation $$a = g \tan \theta$$

where $g$ is the acceleration of gravity and $\theta$ is the angle from the vertical assumed by the restraining member when the inverted pendulum is accelerating at the same rate as the fluid.

It is well-known in hydrostatics that $\rho'g$ is the magnitude of the vertical pressure gradient in a fluid of density $\rho'$ and that it is the Archimedean buoyant force per unit volume. Not so well known is the fact that $\rho'a$ is the pressure gradient existing in a fluid of density $\rho'$ under an imposed dynamic condition of acceleration $a$. This can be proved by taking a cross-section of area A and width $dx$ in the fluid under pressure $p$, with $dx$ in the direction of $a$, and applying Newton's second law.

$$Ap - (p+dp)A = A dx \rho'a$$

or gradient of $p = dp/dx = -\rho'a$. The minus sign indicates that decreasing pressure is in the direction of acceleration. This pressure gradient is the force per unit volume existing in an accelerating fluid due to acceleration $a$. If the mass of an immersed object is $V\rho$, V being its volume and $\rho$ being its density, and if the mass of fluid displaced by it is $V\rho'$, application of the equation $$R = F - (B - W) \tan \theta$$

and Newton's second law gives $$V\rho a = V\rho'a - (V\rho'g - V\rho g) \tan \theta$$

Multiplication, transposition, factoring, and cancellation gives $$a = g \tan \theta$$

or, in terms of the horizontal pressure gradient, $$\rho'a = \rho'g \tan \theta$$

The stated primary objective of the invention is obviously perfectly general in scope and would apply in free space, away from the influence of the gravitational field of the Earth or any other heavenly body, as, for example, in sensing and indicating the magnitude and direction of the acceleration of a rocket or satellite, or in detecting a condition of "weightlessness." In order that the buoyant body 13 may be capable of moving in any direction, it may be constrained, as shown in FIG. 8, by springs 21, 21. By suitable choice of springs the axial and non-axial force constants may be made equal, so that an acceleration in any direction, as shown by way of example by the arrow in FIG. 8 and the corresponding displacement between the solid line and dotted line representations, may produce displacement of the buoyant body 13 in that same direction by an amount proportional to the acceleration as suggested at 13" in FIG. 8. This displacement in the same direction is due to a positive pressure gradient of magnitude $\rho'a$ existing in the fluid of density $\rho'$ as a result of acceleration $a$ imposed upon the fluid by its container as opposed to fictitious or D'Alembert forces. Critical damping of the body 13 may be accomplished, as with the inverted pendulum, by the use of a fluid of a suitable viscosity coefficient in the container 10".

While in the foregoing specification there have been disclosed certain presently preferred embodiments of the invention it is not to be deemed that the invention is limited to the specific examples thus disclosed by way of example and the invention will be understood to include as well all such changes and modifications in the parts, and in the construction, combination and arrangement of parts as shall come within the purview of the appended claims.

I claim:

1. A means for demonstrating an effect of acceleration comprising a container provided with means affording visual observation of the interior thereof, a quantity of fluid in said container, a body of less density than the fluid and of less diameter than the interior diameter of said container, means maintaining said body immersed in the fluid and comprising devices anchoring said body to occupy a predetermined submerged position in said fluid at all times when said container and fluid are not being subjected to acceleration; said devices including flexible means effective, in the event of imposition of acceleration on said container and said fluid and said body in a direction other than parallel to a line extending between said body and said anchoring devices when said body is in repose to permit said body to move in said fluid in the same direction as the direction of the imposed acceleration in reaction to the pressure gradient derived from the imposed acceleration; said fluid being of such viscosity as to impose critical damping on the natural oscillations of said body, said flexible means comprising a pair of stretched elastic members disposed in substantially longitudinal alignment and having their adjacent ends attached to substantially diametrically opposite points on said body and having their other ends anchored to opposite points on the interior of said container.

2. Means for demonstrating an effect of acceleration comprising a container having at least a portion of a wall thereof transparent for visual observation of the interior of the container, a quantity of fluid in said container, a body of less density than said fluid and of less diameter than the diameter of the interior of the container, means maintaining said body at least partially immersed in said fluid comprising an elongated anchoring member having one end attached to said body and the other end thereof attached to the interior surface of said container at a point thereon below said body and which is disposed substantially coincident wtih the vertical center line of said container; said anchoring member and the attachment thereof to said interior surface of the container serving additionally to permit said body to move generally normal to the length of said anchoring member in any direction within the limits established by the wall of the container, and a supporting means on which said container, fluid and anchored body may be moved as a unit about a vertical axial line laterally offset from the vertical center line of said container.

3. An acceleration demonstrating means as claimed in claim 2 which includes a pair of said containers each having a buoyant body anchored in said at least partially immersed condition in fluid in said containers, and in which said supporting means affords a support on which said containers are caused to be moved simultaneously in curved paths generated about a vertical axial line disposed laterally of the vertical center lines of both containers.

References Cited by the Examiner
UNITED STATES PATENTS

| | | | |
|---|---|---|---|
| 957,908 | 5/1910 | Ross | 73—515 X |
| 1,273,746 | 7/1918 | Daniels | 46—91 |
| 1,829,311 | 10/1931 | Tea | 35—19 |
| 2,598,552 | 5/1952 | Jansen | 73—515 X |
| 2,601,440 | 6/1952 | Kerrigan | 73—492 X |

FOREIGN PATENTS

| | | |
|---|---|---|
| 1,076,476 | 4/1954 | France. |
| 316,171 | 4/1916 | Germany. |
| 771,421 | 4/1957 | Great Britain. |

EUGENE R. CAPOZIO, *Primary Examiner.*

H. S. SKOGQUIST, *Assistant Examiner.*